(12) United States Patent
Kim

(10) Patent No.: US 12,024,128 B2
(45) Date of Patent: Jul. 2, 2024

(54) SEAT BACK COVER HAVING STORAGE SECTION FOR VEHICLE

(71) Applicant: DAEIL INDUSTRIAL CO., LTD., Ulsan (KR)

(72) Inventor: Myung Ju Kim, Ulsan (KR)

(73) Assignee: DAEIL INDUSTRIAL CO., LTD., Ulsan (KR)

( * ) Notice: Subject to any disclaimer, the term of this patent is extended or adjusted under 35 U.S.C. 154(b) by 180 days.

(21) Appl. No.: 17/858,220

(22) Filed: Jul. 6, 2022

(65) Prior Publication Data

US 2023/0182645 A1    Jun. 15, 2023

(30) Foreign Application Priority Data

Dec. 14, 2021  (KR) ........................ 10-2021-0178534

(51) Int. Cl.
*B60R 7/00*    (2006.01)
*B60N 2/58*    (2006.01)
*B60R 7/04*    (2006.01)

(52) U.S. Cl.
CPC ............... *B60R 7/043* (2013.01); *B60N 2/58* (2013.01); *B60R 7/005* (2013.01)

(58) Field of Classification Search
CPC ............ B60R 7/043; B60R 2011/0015; B60R 2011/0082
See application file for complete search history.

(56) References Cited

U.S. PATENT DOCUMENTS

| | | | | |
|---|---|---|---|---|
| 6,131,993 A * | 10/2000 | Pesta | ........................ | B60R 7/12 |
| | | | | 297/452.38 |
| 9,573,528 B1 * | 2/2017 | Line | ........................ | B60R 7/005 |
| 10,414,343 B2 * | 9/2019 | Shrewsbury | ............ | B60R 7/043 |
| 11,607,048 B2 * | 3/2023 | Hong | ..................... | A47C 7/622 |
| 11,697,365 B2 * | 7/2023 | Kirzhner | ................ | B60N 2/643 |
| | | | | 297/230.1 |
| 2018/0201196 A1 * | 7/2018 | Hellman | ................. | B60Q 3/233 |
| 2019/0039525 A1 * | 2/2019 | Hu | ........................... | B60R 7/005 |

FOREIGN PATENT DOCUMENTS

| | | |
|---|---|---|
| JP | 2012-046092 A | 3/2012 |
| KR | 20-1997-0031924 U | 7/1997 |
| KR | 20-1998-0066693 A | 10/1998 |
| KR | 20-0252651 Y1 | 11/2001 |
| KR | 10-0579106 B1 | 5/2006 |
| KR | 20-0474566 Y1 | 9/2014 |
| KR | 10-2023908 B1 | 9/2019 |
| KR | 102061854 B1 | 1/2020 |

\* cited by examiner

*Primary Examiner* — Shin H Kim
(74) *Attorney, Agent, or Firm* — NKL LAW; Jae Youn Kim

(57) ABSTRACT

Proposed is a seat back cover having a storage section for a vehicle, in which a rotation plate is provided on a rear side of the seat back cover to form the storage section according to a rotation of the rotation plate as necessary, a storage rotation plate is rotated to conveniently form the storage section only when an article is stored so that various articles may be easily stored in the storage section, and the rotation plate is automatically rotated by elasticity of an elastic support member to make close contact with the back cover when all the articles of the storage section are taken out so that a space of a seat may be efficiently utilized.

5 Claims, 7 Drawing Sheets

SEAT BACK COVER HAVING STORAGE SECTION FOR VEHICLE

BACKGROUND OF THE INVENTION

1. Field of the Invention

The present invention relates to a seat back cover having a storage section for a vehicle, and more particularly, to a seat back cover having a storage section for a vehicle, in which a rotation plate is provided on a rear side of the seat back cover to form the storage section according to a rotation of the rotation plate as necessary, a storage rotation plate is rotated to conveniently form the storage section only when an article is stored so that various articles may be easily stored in the storage section, and the rotation plate is automatically rotated by elasticity of an elastic support member to make close contact with the back cover when all the articles of the storage section are taken out so that a space of a seat may be efficiently utilized.

2. Description of the Related Art

In general, a back cover may be installed on a rear surface of a vehicle seat in order to increase functionality of a seat and an outer plate the seat.

The back cover may be installed on the seat through fastening forces of clips provided at upper and lower ends of a front side of the back cover, and a storage pocket configured as a mesh may be installed on a rear surface of the back cover to store articles.

When vehicle occupants intend to store or take out various articles such as belongings in the storage pocket, the vehicle occupants may pull an elastic band provided at an upper end of the storage pocket with one hand to widen an inlet, and put various articles into a storage space or take out the articles stored in the storage space with the other hand.

However, since the storage pocket is configured as a mesh as described above, small articles may escape through the mesh without being caught in the mesh, so that the small articles may not be stored in the mesh.

In addition, the conventional storage pocket as described above may protrude to a rear side of the back cover even when no articles are stored, so that utilization of an inner space of the storage pocket may be reduced.

DOCUMENTS OF RELATED ART

Patent Documents (Patent Document 1) Korean Unexamined Utility Model Publication No. 20-1997-31924 (published on Jul. 24, 1997)
(Patent Document 2) Korean Utility Model Registration No. 0252651 (registered on Oct. 19, 2001)

SUMMARY OF THE INVENTION

To solve the problems described above, an object of the present invention is to provide a seat back cover having a storage section for a vehicle, in which a rotation plate is provided on a rear side of the seat back cover to form the storage section according to a rotation of the rotation plate as necessary.

In addition, an object of the present invention is to provide a seat back cover having a storage section for a vehicle, in which a storage rotation plate is rotated to conveniently form the storage section only when an article is stored so that various articles may be easily stored in the storage section.

Further, an object of the present invention is to provide a seat back cover having a storage section for a vehicle, in which the rotation plate is automatically rotated by elasticity of an elastic support member to make close contact with the back cover when all the articles of the storage section are taken out so that a space of a seat may be efficiently utilized.

In addition, an object of the present invention is to provide a seat back cover having a storage section for a vehicle, in which the elastic support member using a band is coupled to the seat back cover and the storage rotation plate to facilitate installation so that productivity may be improved.

To achieve the objects described above, according to the present invention, there is provided a seat back cover having a storage section for a vehicle, the seat back cover including: a seat back cover (100) including a back cover main body (110) having a rectangular plate shape in which left and right sides of the back cover main body (110) are bent in an arc shape so that centers of the left and right sides are concave toward a rear side, and upper and lower sides of the back cover main body (110) are bent in an arc shape so that centers of the upper and lower sides are concave toward a front side, and including a close contact groove (120) formed at a rear center of the back cover main body (110) in a rectangular shape so as to be concave toward the front side; a storage rotation plate (200) including a rotation plate body (210) having a same shape as the close contact groove (120) of the seat back cover (100) and making close contact with the close contact groove (120), insertion spaces (220) formed on both inner surfaces of the rotation plate body (210), and rotation plate insertion holes (230) vertically extending along inner surfaces of both edges of the rotation plate body (210) to communicate with the insertion space (220), and rotated to the rear side of the back cover main body (110) about a lower portion of the rotation plate body (210); and a pair of elastic support members (300) having one ends coupled to both sides of a front surface of the back cover main body (110) of the seat back cover (100), respectively, and opposite ends penetrating through both sides of the back cover main body (110) so as to be inserted into and coupled to the rotation plate insertion holes (230) of the storage rotation plate (200), respectively, and configured to support the rotation plate body (210) of the storage rotation plate (200) to make close contact with the close contact groove (120) of the back cover main body (110) by elasticity.

In addition, the seat back cover (100) may include: a pair of latching hooks (130) protruding forward from the both sides of the front surface of the back cover main body (110), respectively, and bent toward an outside at a right angle; and a pair of support member through-holes (140) formed on lower portions of the latching hooks (130) to allow the elastic support members (300) to pass through the support member through-holes (140), respectively.

In addition, the elastic support member (300) may include: an elastic support band (310) having a rectangular shape, and having an outer end penetrating through each of the both sides of the front surface of the back cover main body (110) to elastically support the rotation plate body (210); a latching band (320) spreading outward from an inner end of the elastic support band (310) to the front side of the back cover main body (110) so as to be latched to the back cover main body (110) to restrict a rotation angle of the rotation plate body (210) when the rotation plate body (210) rotates to the rear side; a back cover support band (330) having one end coupled to the inner end of the elastic support band (310); a first latching plate (340) coupled to the outer end of the elastic support band (310), and inserted into the insertion space (220) through the rotation plate insertion hole (230) of the storage rotation plate (200) so as to be latched to the rotation plate insertion hole (230) to support the rotation plate body (210) when the rotation plate body (210) rotates to the rear side; and a second latching plate (350) having a plate shape, formed at a center thereof with a latching hole (351), and having one end coupled to an opposite end of the back cover support band (330) that has the one end coupled to the elastic support band (310) so as to be fixed to each of the both sides of the front surface of the back cover main body (110) of the seat back cover (100).

In addition, the back cover support band (330) may include: a first back cover support band (331) having one end coupled to an upper portion of the inner end of the elastic support band (310), and an opposite end coupled to the second latching plate (350); and a second back cover support band (332) having one end coupled to a lower portion of the inner end of the elastic support band (310), and an opposite end coupled to the second latching plate (350).

According to the seat back cover having the storage section for the vehicle of the present invention, which is configured as described above, the rotation plate is provided on the rear side of the seat back cover to form the storage section according to the rotation of the rotation plate as necessary.

In addition, according to the present invention, the storage rotation plate is rotated to conveniently form the storage section only when an article is stored so that various articles can be easily stored in the storage section.

Further, according to the present invention, the rotation plate is automatically rotated by the elasticity of the elastic support member to make close contact with the back cover when all the articles of the storage section are taken out so that a space of a seat can be efficiently utilized.

In addition, according to the present invention, the elastic support member using the band is coupled to the seat back cover and the storage rotation plate to facilitate installation so that productivity can be improved.

DETAILED DESCRIPTION OF THE INVENTION

Hereinafter, a preferred embodiment of the present invention will be described in detail with reference to the accompanying drawings.

Figure 1:
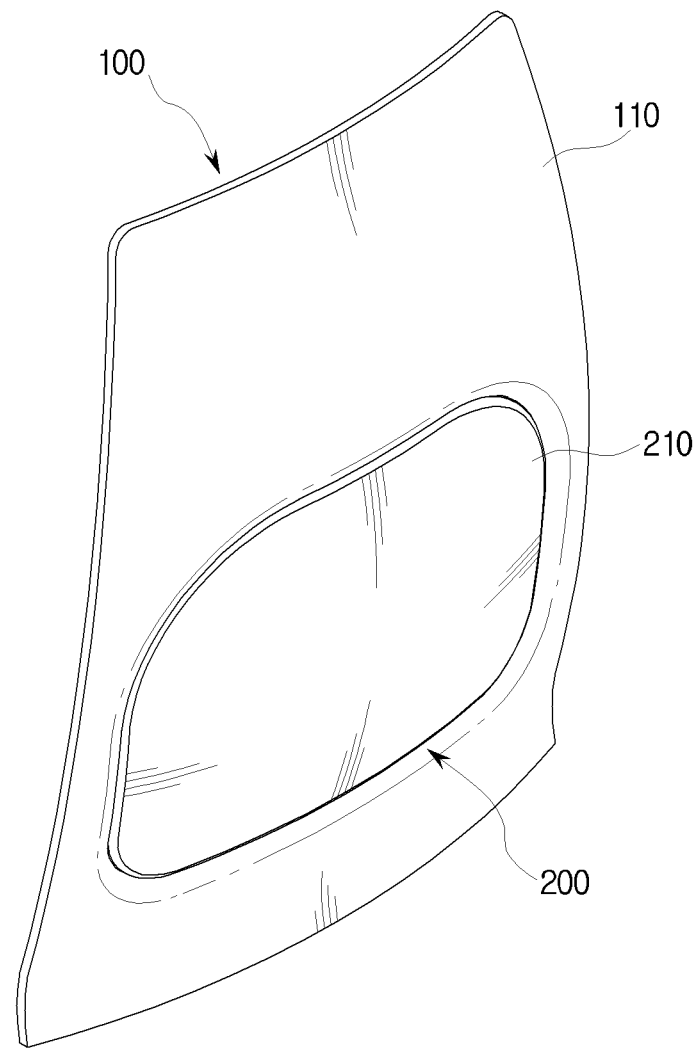
FIG. 1 is a view illustrating a seat back cover having a storage section for a vehicle according to the present invention.
Figure 2:
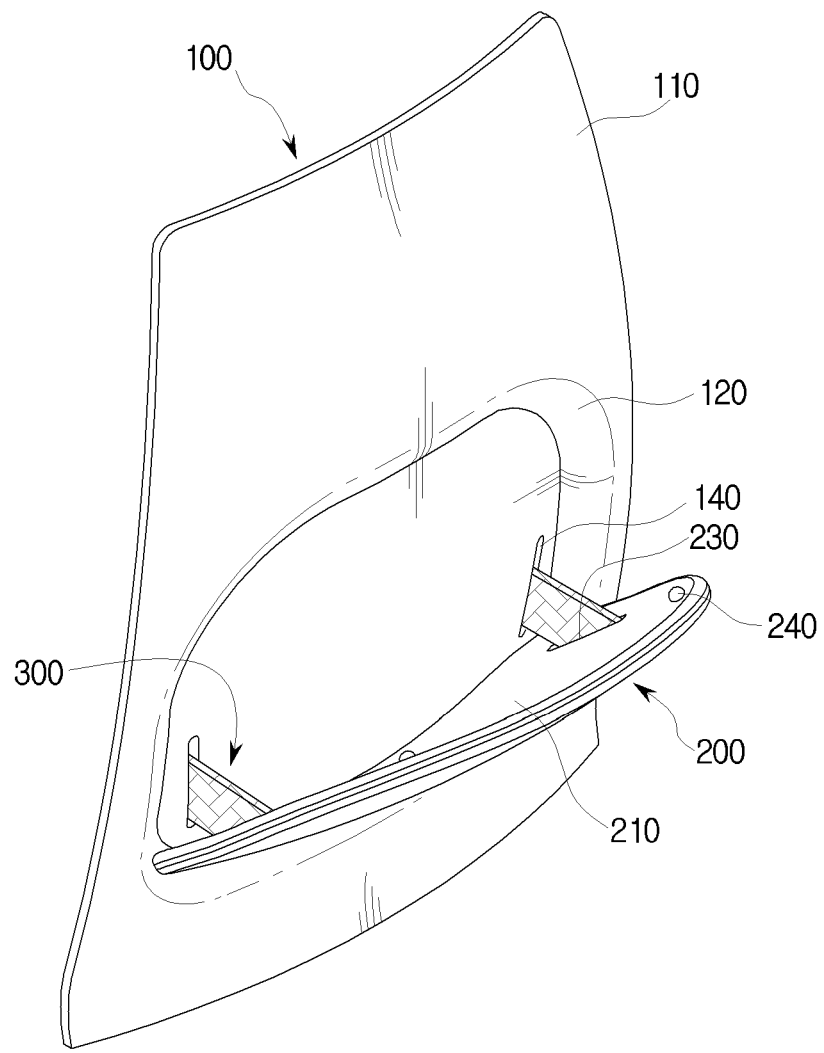
FIG. 2 is a view illustrating a state in which a storage rotation plate of the seat back cover having the storage section for the vehicle according to the present invention is rotated.

As shown in FIGS. 1 and 2, a seat back cover having a storage section for a vehicle according to the present invention may include a seat back cover 100, a storage rotation plate 200, and an elastic support member 300.

Figure 3:
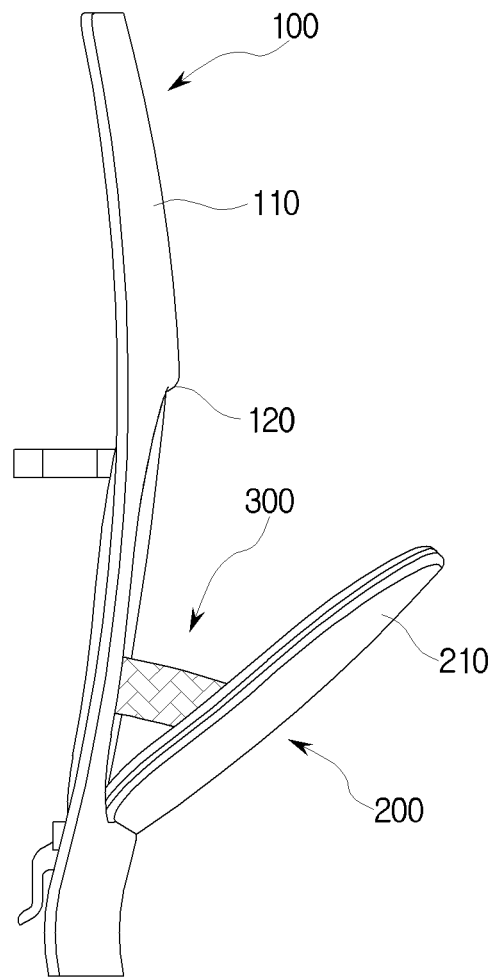
FIG. 3 is a side view illustrating the state in which the storage rotation plate of the seat back cover having the storage section for the vehicle according to the present invention is rotated.

First, as shown in FIGS. 2 and 3, the seat back cover 100 may include a back cover main body 110 having a rectangular plate shape in which left and right sides of the back cover main body 110 are bent in an arc shape so that centers of the left and right sides are concave toward a rear side, and upper and lower sides of the back cover main body 110 are bent in an arc shape so that centers of the upper and lower sides are concave toward a front side, and may include a close contact groove 120 formed at a rear center of the back cover main body 110 in a rectangular shape so as to be concave toward the front side.

In addition, the seat back cover 100 may include: a pair of latching hooks 130 protruding forward from the both sides of the front surface of the back cover main body 110, respectively, and bent toward an outside at a right angle; and a pair of support member through-holes 140 formed on lower portions of the latching hooks 130 to allow the elastic support members 300 to pass through the support member through-holes 140, respectively.

In this case, the support member through-hole 140 may be preferably implemented to vertically extend so that a first latching plate 340 and an elastic support band 310 of the elastic support member, which will be described below, may pass through the support member through-hole 140.

In addition, the storage rotation plate 200 may include a rotation plate body 210 having a same shape as the close contact groove 120 of the seat back cover 100 and making close contact with the close contact groove 120, insertion spaces 220 formed on both inner portions of a front surface of the rotation plate body 210, and rotation plate insertion holes 230 vertically extending on both sides of the front surface of the rotation plate body 210 to communicate with the insertion space 220.

In this case, the rotation plate body 210 may be preferably implemented to rotate toward the rear side of the back cover main body 110 about a hinge or a hinge band (not shown in the drawings) provided in a lower portion of the rotation plate body 210.

In addition, the storage rotation plate 200 may include a pair of cushioning protrusions 240 protruding forward from both sides of an upper portion of a front surface of the rotation plate body 210 to alleviate an impact with the close contact groove 120 of the seat back cover 100, which is caused by elasticity of the elastic support member 300.

Figure 4:
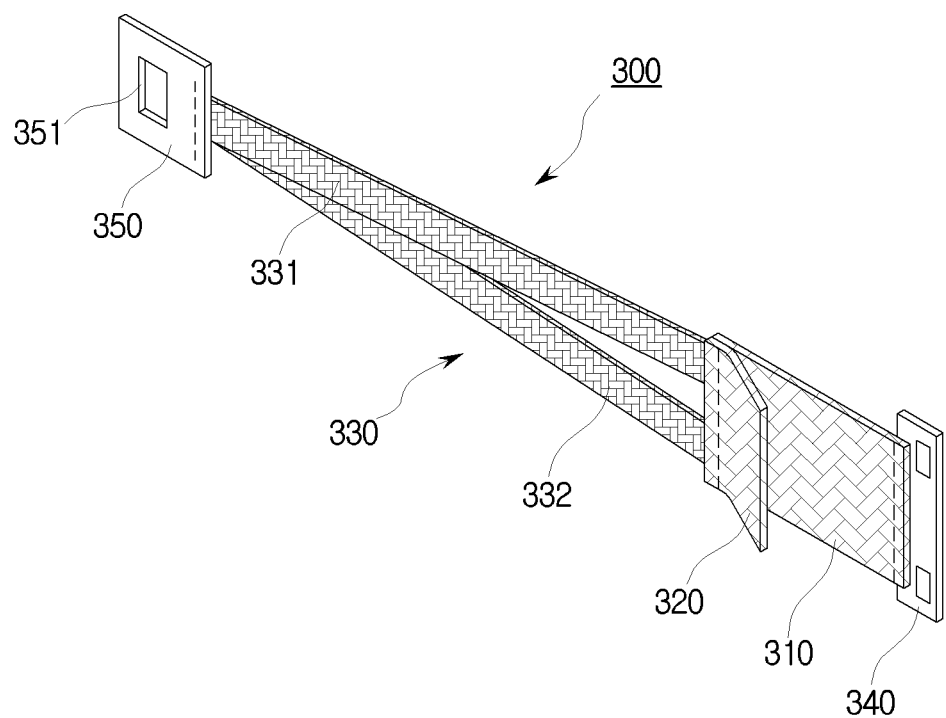
FIG. 4 is a view illustrating an elastic support member of the seat back cover having the storage section for the vehicle according to the present invention.

Meanwhile, as shown in FIG. 4, a pair of elastic support members 300 having one ends coupled to both sides of a front surface of the back cover main body 110 of the seat back cover 100, respectively, and opposite ends penetrating through both sides of the back cover main body 110 so as to be inserted into and coupled to the rotation plate insertion holes 230 of the storage rotation plate 200, respectively, and configured to support the rotation plate body 210 of the storage rotation plate 200 to make close contact with the close contact groove 120 of the back cover main body 110 by elasticity may include: an elastic support band 310 having a rectangular shape, and having an outer end penetrating through each of the both sides of the front surface of the back cover main body 110 to elastically support the rotation plate body 210; a latching band 320 spreading outward from an inner end of the elastic support band 310 to the front side of the back cover main body 110 so as to be latched to the back cover main body 110 to restrict a rotation angle of the rotation plate body 210 when the rotation plate body 210 rotates to the rear side; and a back cover support band 330 having one end coupled to the inner end of the elastic support band 310.

In this case, the back cover support band 330 may include: a first back cover support band 331 having one end coupled to an upper portion of the inner end of the elastic support band 310, and an opposite end coupled to the second latching plate 350; and a second back cover support band 332 having one end coupled to a lower portion of the inner end of the elastic support band 310, and an opposite end coupled to the second latching plate 350.

In addition, the elastic support member 300 may include: a first latching plate 340 coupled to the outer end of the elastic support band 310, and inserted into the insertion space 220 through the rotation plate insertion hole 230 of the storage rotation plate 200 so as to be latched to the rotation plate insertion hole 230 to support the rotation plate body 210 when the rotation plate body 210 rotates to the rear side; and a second latching plate 350 having a plate shape, formed at a center thereof with a latching hole 351, and having one end coupled to an opposite end of the back cover support band 330 that has the one end coupled to the elastic support band 310 so as to be fixed to each of the both sides of the front surface of the back cover main body 110 of the seat back cover 100.

Hereinafter, an operation of the seat back cover having the storage section for the vehicle according to the present invention will be described.

Figure 5:
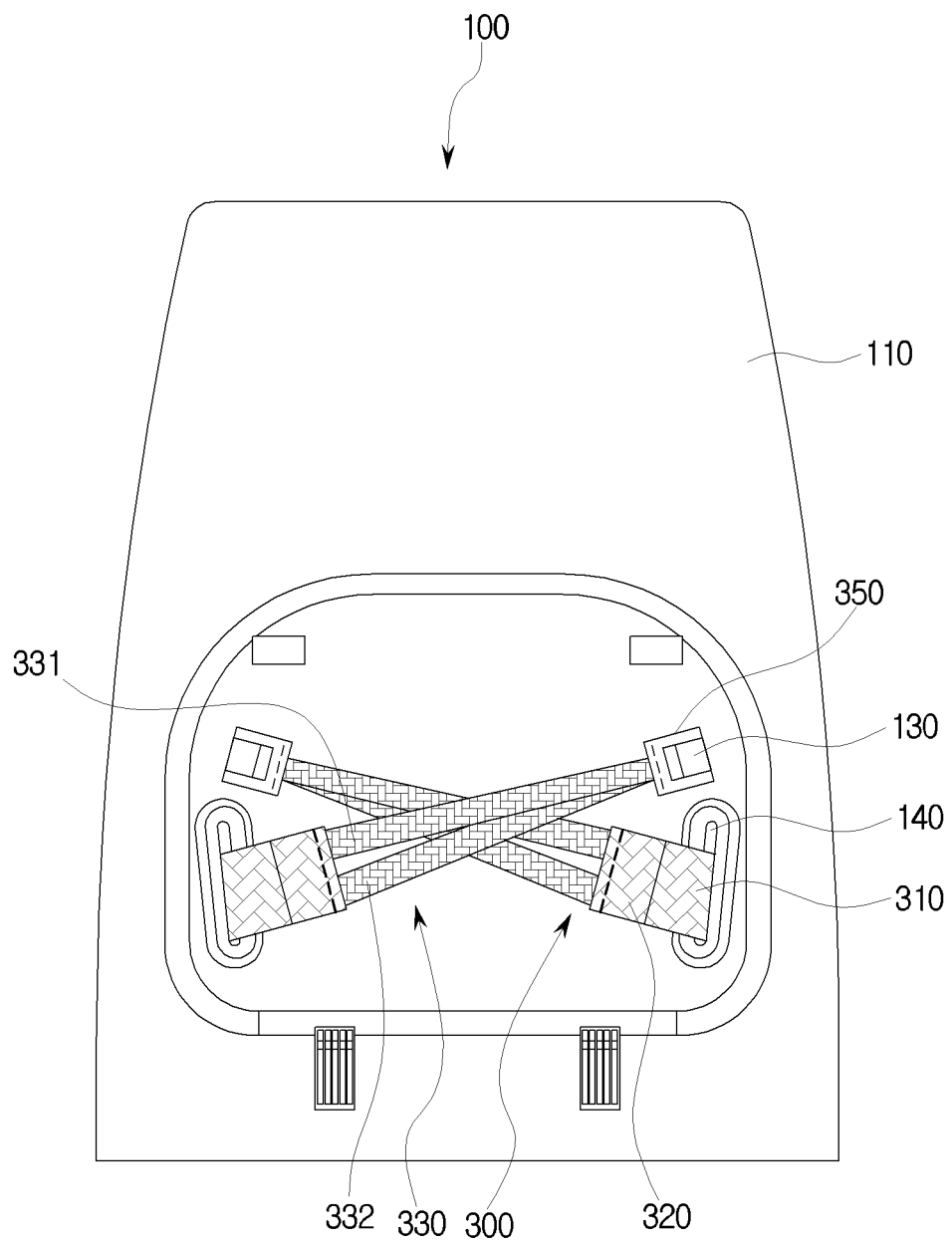
FIG. 5 is a view illustrating a front surface of the seat back cover before rotating the storage rotation plate of the seat back cover having the storage section for the vehicle according to the present invention.
Figure 6:
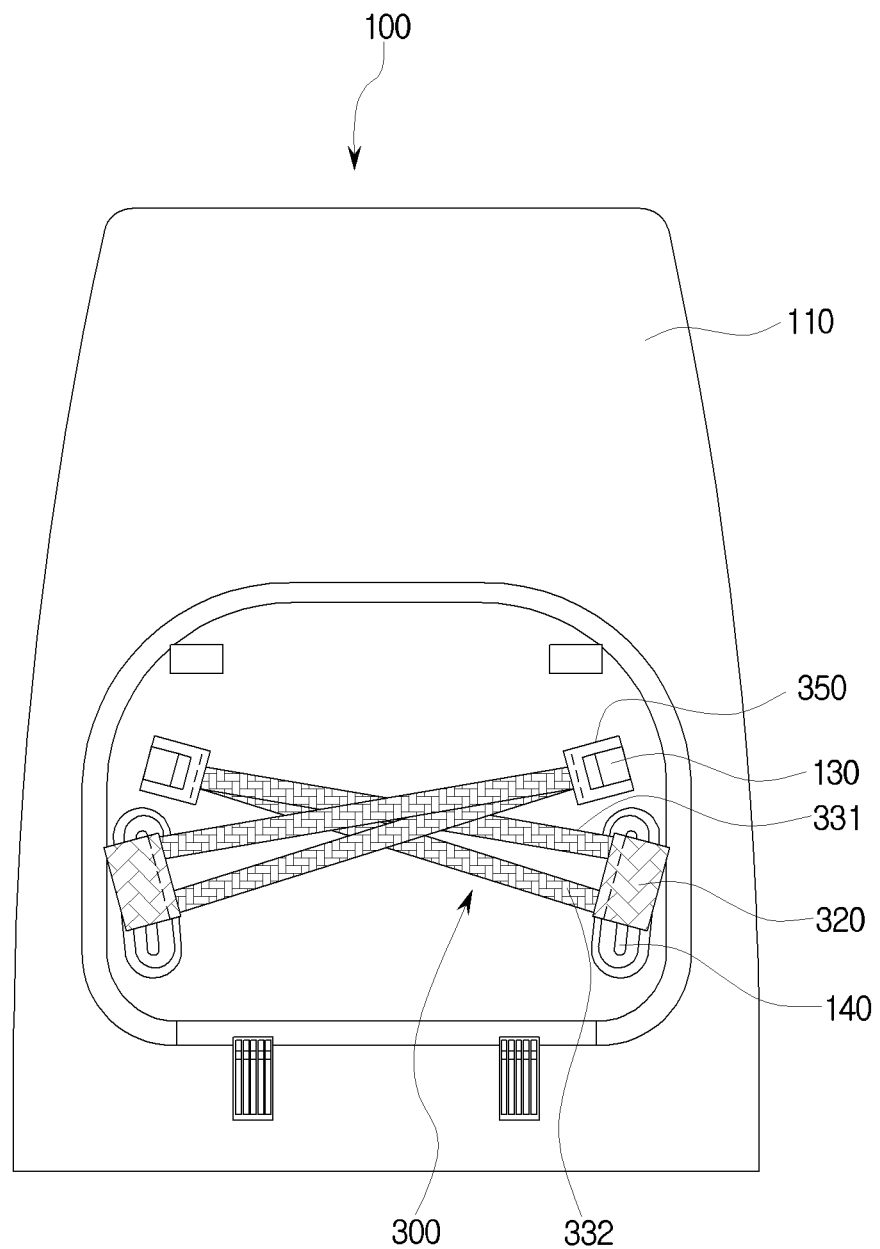
FIG. 6 is a view illustrating the front surface of the seat back cover after rotating the storage rotation plate of the seat back cover having the storage section for the vehicle according to the present invention.

As shown in FIGS. 2 and 5, the second latching plates 350 of the pair of elastic support members 300 may be latched to the latching hooks 130, respectively, so that the latching hooks 130 provided on the both sides of the front surface of the back cover main body 110 may be inserted into the latching holes 351 formed at the centers of the second latching plates 350.

In addition, the back cover support band 330 and the first latching plate 340 may penetrate from the front side to the rear side of the back cover main body 110 through the support member through-hole 140 formed on the lower portion of the latching hook 130.

Figure 7:
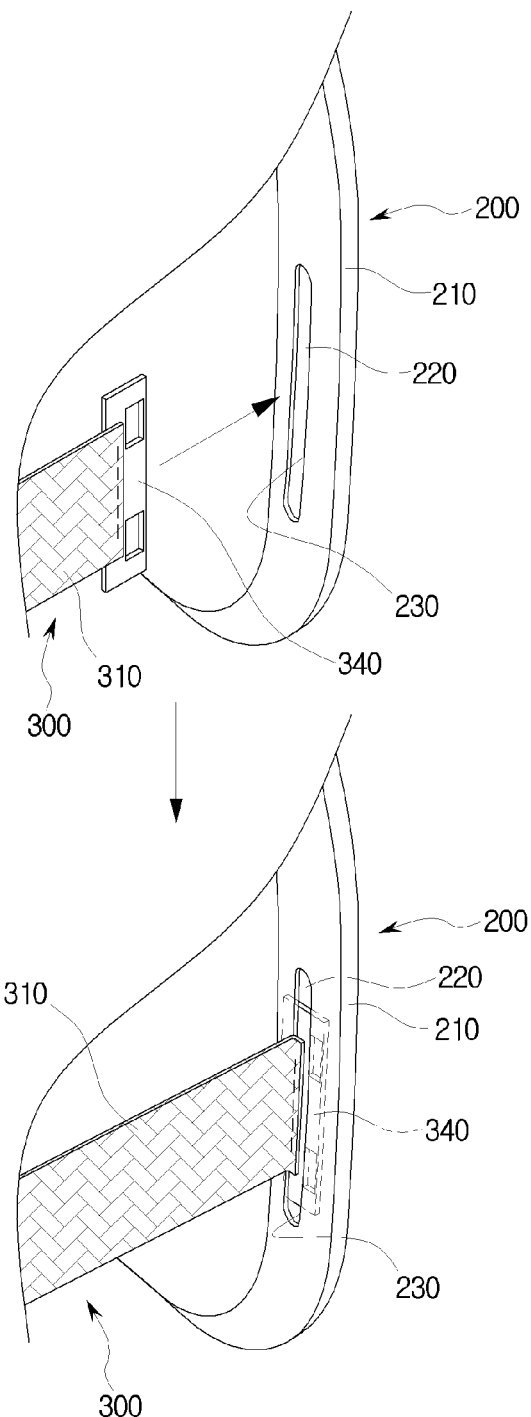
FIG. 7 is a view illustrating a state in which the elastic support member of the seat back cover having the storage section for the vehicle according to the present invention is coupled to the storage rotation plate.

As shown in FIG. 7, the first latching plate 340 of the elastic support member 300 that has passed through the support member through-hole 140 as described above may be inserted into the insertion space 220 through the rotation plate insertion hole 230 formed on the both sides of the front surface of the rotation plate body 210 of the storage rotation plate 200.

In addition, the first latching plate 340 that has been inserted into the insertion space 220 as described above may be latched to the rotation plate insertion hole 230 in which an elastic force is generated by the elastic support band 310 so as to be maintained in a state where the first latching plate 340 is inserted into the insertion space 220 without being separated to the front side.

When a user forms the storage section to store an article in the seat back cover 100 while the elastic support member 300 is coupled to the seat back cover 100 and the storage rotation plate 200 as described above, as shown in FIGS. 2 and 3, the user may grip an upper end of the rotation plate body 210 of the storage rotation plate 200 with a hand and pull the rotation plate body 210 to the rear side of the back cover main body 110, that is, in a direction toward the user, so that the elastic support band 310 may be drawn out to the rear side from the support member through-hole 140 by elasticity of the elastic support band 310 of the elastic support member 300 and the first and second back cover support bands 331 and 332 of the back cover support band 330, the rotation plate body 210 may be rotated to the rear side, that is, in the direction toward the user about the lower portion of the rotation plate body 210, and the storage section (not shown in the drawings) may be formed between the rotation plate body 210 and the close contact groove 120 of the seat back cover 100.

In this case, the latching band 320 spreading outward from the inner end of the elastic support band 310 to the front side of the back cover main body 110 may be latched to the support member through-hole 140 as the elastic support band 310 is drawn out to the rear side of the support member through-hole 140, so that the elastic support band 310 may stop being drawn out from the support member through-hole 140.

Therefore, since the latching band 320 is latched to the support member through-hole 140 as described above, the rotation angle of the rotation plate body 210 may be restricted when the rotation plate body 210 rotates to the rear side.

When the storage section is formed between the rotation plate body 210 and the close contact groove 120 of the seat back cover 100 as described above, the user may store various articles in the storage section.

In addition, after storing the articles in the storage section as described above, when the user releases the hand gripping the rotation plate body 210 of the storage rotation plate 200, elasticity may be applied to the rotation plate body 210 in a direction toward the close contact groove 120 of the seat back cover, that is, toward the front side of the rotation plate body 210 by the elasticity of the elastic support band 310 and the back cover support band 330 so as to support the articles stored in the storage section.

As described above, according to the present invention, the storage rotation plate 200 may be provided on the rear side of the seat back cover 100 to form the storage section according to the rotation of the storage rotation plate 200 when an article is required to be stored, and the storage rotation plate 200 may be rotated to conveniently form the storage section only when the article is stored as described above so that various articles may be easily stored in the storage section.

In this case, the elastic support bands 310 drawn out to the rear side from the support member through-holes 140 of the back cover main body 110 on the both sides of the back cover main body may be maintained to be inserted into the rotation plate insertion holes 230 of the rotation plate body 210 on both sides of the rotation plate body 210 that is rotated to the rear side, so that the article stored in the storage section may be prevented from being discharged to the both sides of the rotation plate body 210.

In addition, when the user releases the rotation plate body 210 from the hand after gripping the rotation plate body 210 by the hand and taking out all the articles stored in the storage section, the elastic support band 310 that has been drawn out may be contracted toward the front surface of the back cover main body 110 through the support member through-hole 140 by the elasticity of the first and second back cover support bands 331 and 332 of the back cover support band 330, and the rotation plate body 210 may rotate to the front side to automatically make close contact with the close contact groove 120 of the seat back cover 100.

Since the rotation plate body 210 of the storage rotation plate 200 is rotated by the elasticity of the elastic support member 300 to automatically make close contact with the close contact groove 120 of the seat back cover 100 when all the articles of the storage section are taken out as described above, a space of a seat may be efficiently utilized.

What is claimed is:

1. A seat back cover having a storage section for a vehicle, the seat back cover comprising:
    a seat back cover (100) including a back cover main body (110) having a rectangular plate shape in which left and right sides of the back cover main body (110) are bent in an arc shape so that centers of the left and right sides are concave toward a rear side, and upper and lower sides of the back cover main body (110) are bent in an arc shape so that centers of the upper and lower sides are concave toward a front side, and including a close contact groove (120) formed at a rear center of the back cover main body (110) in a rectangular shape so as to be concave toward the front side;
    a storage rotation plate (200) including a rotation plate body (210) having a same shape as the close contact groove (120) of the seat back cover (100) and making close contact with the close contact groove (120), insertion spaces (220) formed on both inner surfaces of the rotation plate body (210), and rotation plate insertion holes (230) vertically extending along inner surfaces of both edges of the rotation plate body (210) to communicate with the insertion space (220), and rotated to the rear side of the back cover main body (110) about a lower portion of the rotation plate body (210); and
    a pair of elastic support members (300) having one ends coupled to both sides of a front surface of the back cover main body (110) of the seat back cover (100), respectively, and opposite ends penetrating through both sides of the back cover main body (110) so as to be inserted into and coupled to the rotation plate insertion holes (230) of the storage rotation plate (200), respectively, and configured to support the rotation plate body (210) of the storage rotation plate (200) to make close contact with the close contact groove (120) of the back cover main body (110) by elasticity.

2. The seat back cover of claim 1, wherein the seat back cover (100) includes:
    a pair of latching hooks (130) protruding forward from the both sides of the front surface of the back cover main body (110), respectively, and bent toward an outside at a right angle; and
    a pair of support member through-holes (140) formed on lower portions of the latching hooks (130) to allow the elastic support members (300) to pass through the support member through-holes (140), respectively.

3. The seat back cover of claim 1, wherein the elastic support member (300) includes:
    an elastic support band (310) having a rectangular shape, and having an outer end penetrating through each of the both sides of the front surface of the back cover main body (110) to elastically support the rotation plate body (210);
    a latching band (320) spreading outward from an inner end of the elastic support band (310) to the front side of the back cover main body (110) so as to be latched to the back cover main body (110) to restrict a rotation angle of the rotation plate body (210) when the rotation plate body (210) rotates to the rear side;
    a back cover support band (330) having one end coupled to the inner end of the elastic support band (310);
    a first latching plate (340) coupled to the outer end of the elastic support band (310), and inserted into the insertion space (220) through the rotation plate insertion hole (230) of the storage rotation plate (200) so as to be latched to the rotation plate insertion hole (230) to support the rotation plate body (210) when the rotation plate body (210) rotates to the rear side; and
    a second latching plate (350) having a plate shape, formed at a center thereof with a latching hole (351), and having one end coupled to an opposite end of the back cover support band (330) that has the one end coupled to the elastic support band (310) so as to be fixed to each of the both sides of the front surface of the back cover main body (110) of the seat back cover (100).

4. The seat back cover of claim 3, wherein the back cover support band (330) includes:
    a first back cover support band (331) having one end coupled to an upper portion of the inner end of the elastic support band (310), and an opposite end coupled to the second latching plate (350); and
    a second back cover support band (332) having one end coupled to a lower portion of the inner end of the elastic support band (310), and an opposite end coupled to the second latching plate (350).

5. The seat back cover of claim 1, wherein the storage rotation plate (200) includes a pair of cushioning protrusions (240) protruding forward from both sides of an upper portion of a front surface of the rotation plate body (210) to alleviate an impact with the close contact groove (120) of the seat back cover (100), which is caused by the elasticity of the elastic support member (300).

* * * * *